(12) United States Patent
Takenaka et al.

(10) Patent No.: US 7,613,277 B2
(45) Date of Patent: *Nov. 3, 2009

(54) RADIATION IMAGING APPARATUS, RADIATION IMAGING SYSTEM, AND METHOD OF CONTROLLING RADIATION IMAGING APPARATUS

(75) Inventors: Katsuro Takenaka, Honjo (JP); Tadao Endo, Honjo (JP); Toshio Kameshima, Kumagaya (JP); Tomoyuki Yagi, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/175,495

(22) Filed: Jul. 18, 2008

(65) Prior Publication Data

US 2008/0279334 A1 Nov. 13, 2008

Related U.S. Application Data

(63) Continuation of application No. 11/755,371, filed on May 30, 2007, now Pat. No. 7,421,063.

(30) Foreign Application Priority Data

Jun. 26, 2006 (JP) ............................. 2006-175568
May 10, 2007 (JP) ............................. 2007-125240

(51) Int. Cl.
*H05G 1/58* (2006.01)
(52) U.S. Cl. ......................... 378/116; 378/91; 378/98.8
(58) Field of Classification Search ................... 378/62, 378/91, 98.8, 101, 103, 116–118
See application file for complete search history.

(56) References Cited

U.S. PATENT DOCUMENTS

| 6,075,256 | A | 6/2000 | Kaifu et al. | 257/53 |
| 6,512,279 | B2 | 1/2003 | Kaifu et al. | 257/448 |
| 6,897,429 | B1 | 5/2005 | Turner et al. | 250/214 R |
| 6,952,015 | B2 | 10/2005 | Kameshima | 250/370.11 |
| 6,952,464 | B2 | 10/2005 | Endo | 378/98.11 |
| 6,982,422 | B2 | 1/2006 | Kaifu et al. | 250/370.09 |
| 6,985,555 | B2 | 1/2006 | Endo | 378/98.11 |
| 7,002,157 | B2 | 2/2006 | Kameshima | 250/370.11 |

(Continued)

FOREIGN PATENT DOCUMENTS

JP 8-116044 5/1996

(Continued)

*Primary Examiner*—Jurie Yun
(74) *Attorney, Agent, or Firm*—Fitzpatrick, Cella, Harper & Scinto

(57) ABSTRACT

A radiation imaging apparatus is capable of taking a moving picture by acquisition by a reading circuit of a plurality of radiation image signals on the basis of a plurality of successive times of irradiation of a radiation detector with radiation rays. The radiation detector has a two-dimensional array of pixels. In a period between a start of an n-th time of irradiation with radiation rays and a start of an (n+1)-th time of irradiation with radiation rays, where n is a natural number, a controller switches an operation status of an analog-to-digital converter that converts electric signals read by the reading circuit into digital signals so that power consumption of the analog-to-digital converter is reduced.

14 Claims, 14 Drawing Sheets

U.S. PATENT DOCUMENTS

| | | | |
|---|---|---|---|
| 7,012,260 B2 | 3/2006 | Endo | 250/370.11 |
| 7,022,997 B2 | 4/2006 | Kaifu et al. | 250/370.14 |
| 7,138,639 B2 | 11/2006 | Kameshima | 250/370.11 |
| 7,154,099 B2 | 12/2006 | Endo | 250/370.11 |
| 7,227,926 B2 | 6/2007 | Kameshima et al. | 378/98.9 |
| 7,239,685 B2 | 7/2007 | Petrick et al. | 378/116 |
| 7,421,063 B2 * | 9/2008 | Takenaka et al. | 378/116 |
| 2002/0016706 A1 | 2/2002 | Cooke et al. | 703/20 |
| 2005/0109927 A1 | 5/2005 | Takenaka et al. | 250/252.1 |
| 2005/0199834 A1 | 9/2005 | Takenaka et al. | 250/580 |
| 2005/0200720 A1 | 9/2005 | Kameshima et al. | 348/220.1 |
| 2005/0207534 A1 | 9/2005 | Petrick et al. | 378/114 |
| 2005/0220269 A1 | 10/2005 | Endo et al. | 378/114 |
| 2005/0264665 A1 | 12/2005 | Endo et al. | 348/308 |
| 2006/0119719 A1 | 6/2006 | Kameshima | 348/308 |
| 2006/0192130 A1 | 8/2006 | Yagi | 250/370.14 |
| 2006/0289774 A1 | 12/2006 | Endo et al. | 250/370.09 |
| 2007/0040099 A1 | 2/2007 | Yokoyama et al. | 250/208.1 |
| 2007/0069144 A1 | 3/2007 | Kameshima | 250/370.09 |
| 2007/0080299 A1 | 4/2007 | Endo et al. | 250/370.09 |
| 2007/0096032 A1 | 5/2007 | Yagi et al. | 250/370.11 |
| 2007/0125952 A1 | 6/2007 | Endo et al. | 250/369 |
| 2007/0131843 A1 | 6/2007 | Yokoyama et al. | 250/205 |
| 2007/0183573 A1 | 8/2007 | Kameshima et al. | 378/98.9 |
| 2007/0210258 A1 | 9/2007 | Endo et al. | 250/370.09 |
| 2007/0290143 A1 | 12/2007 | Kameshima et al. | 250/370.09 |
| 2007/0291904 A1 | 12/2007 | Takenaka et al. | 378/207 |
| 2007/0297567 A1 | 12/2007 | Takenaka et al. | 378/98.2 |
| 2008/0011958 A1 | 1/2008 | Endo et al. | 250/370.08 |
| 2008/0013686 A1 | 1/2008 | Kameshima et al. | 378/98 |
| 2008/0029688 A1 | 2/2008 | Yagi et al. | 250/208.1 |
| 2008/0054182 A1 | 3/2008 | Yokoyama et al. | 250/370.09 |
| 2008/0083876 A1 | 4/2008 | Endo et al. | 250/369 |

FOREIGN PATENT DOCUMENTS

| | | |
|---|---|---|
| JP | 2005-270656 | 10/2005 |

* cited by examiner

RADIATION IMAGING APPARATUS, RADIATION IMAGING SYSTEM, AND METHOD OF CONTROLLING RADIATION IMAGING APPARATUS

RELATED CASES

This application is a continuation of U.S. patent application Ser. No. 11/755,371, filed May 30, 2007, claims benefit of the filing date of that application under 35 U.S.C. § 120, and claims benefit under 35 U.S.C. § 119 of Japanese patent applications 2006-175568 and 2007-125240, filed Jun. 26, 2006, and May 10, 2007, respectively; the entire disclosure of each of those three earlier applications is incorporated herein by reference.

BACKGROUND OF THE INVENTION

1. Field of the Invention

The present invention relates to radiation imaging apparatuses and radiation imaging systems. More specifically, for example, the present invention relates to a radiation imaging apparatus and system that are suitable for still-picture imaging, such as ordinary imaging, or moving-picture imaging, such as fluoroscopy, in medical diagnosis. In the present invention, in addition to α rays, β rays, and γ rays formed of particles (including photons) emitted by radioactive decay, radiation rays include beams having the same or greater order of energy, for example, X rays, corpuscular rays, and cosmic rays.

2. Description of the Related Art

Recently, as radiation imaging apparatuses are being used for X-ray medical image diagnosis or non-destructive testing, radiation imaging apparatuses including flat panel detectors (hereinafter abbreviated as "FPDs") composed of semiconductor materials are coming into practical use. In a radiation imaging apparatus including an FPD, radiation rays, such as X rays, that have transmitted through a subject, such as a patient, are converted into analog electric signals by the FPD, and analog-to-digital conversion is executed to convert the analog electric signals into digital image signals, whereby a digital image is obtained. FPDs can be broadly classified into direct-conversion FPDs and indirect-conversion FPDs. A direct-conversion radiation imaging apparatus includes an FPD having a two-dimensional array of pixels including semiconductor-based converters that directly convert radiation rays emitted from a-Se or the like into charges. An indirect-conversion radiation imaging apparatus includes an FPD having a two-dimensional array of pixels each including a converter having a wavelength converter and a photoelectric converter element. The waveform converter is implemented, for example, by a phosphor member capable of converting radiation rays into visible light. The photoelectric converter element is composed of a semiconductor material capable of converting light into charges, such as a-Si. The indirect-conversion radiation imaging apparatus is disclosed, for example, in Japanese Patent Laid-Open No. 08-116044. These radiation imaging apparatuses including FPDs can convert radiation images into digital information, so that image information can be transmitted instantly to a remote location. For example, in the field of medical image diagnosis, the radiation imaging apparatuses including FPDs are used as digital imaging apparatuses for still-picture imaging such as ordinary imaging or moving-picture imaging such as fluoroscopy.

With the radiation imaging apparatuses including FPDs composed of semiconductor materials, reduction of power consumption is an issue to be addressed. According to techniques disclosed in Japanese Patent Laid-Open No. 2005-270656, the FPD and a driving circuit for driving the FPD or a reading circuit for reading signals from the FPD are powered on until a cycle of an irradiating sequence and imaging is completed, and these components are caused to be idle or powered off in other periods, so that power consumption is reduced.

SUMMARY OF THE INVENTION

However, even with the techniques disclosed in Japanese Patent Laid-Open No. 2005-270656, further reduction of power consumption is desired. Particularly, in the case of moving-picture imaging, such as fluoroscopy with which the duration of a cycle of an irradiation sequence and an imaging cycle is relatively long, further reduction in power consumption is desired. In a radiation imaging apparatus including an FPD composed of semiconductor materials, in order to alleviate the risk of noise being mixed into signals read from the FPD, a reading circuit implemented by an integrated circuit (IC) including operational amplifiers, sample-and-hold circuits, and an analog multiplexer, is disposed in proximity to the FPD. The operational amplifiers are provided in association with individual signal lines connected to columns of pixels of the FPD, so that the number of operational amplifiers in the reading circuit increases as the number of pixels in the FPD increases. Particularly, in the case of an FPD having a size of 41 cm×41 cm and capable of imaging the chest, for example, assuming that the pixel pitch is 160 μm, 2,560×2, 560 pixels are provided. Furthermore, operational amplifiers in the reading circuit are provided in association with individual signal lines in the FPD. In such a reading circuit including a large number of operational amplifiers as described above, power consumption and heat generation are intense, so that noise (thermal noise, etc.) increases. Particularly, in moving-picture imaging, the cycle of an irradiation sequence and imaging is continued for a long period, so that the reading circuit executes a reading operation at a high speed repeatedly over a long period. Thus, power consumption and heat generation in the reading circuit further increases, so that the effect of noise further increases. Furthermore, since the reading circuit is disposed in proximity to the FPD, the characteristics of pixels in the FPD vary within the frame, so that artifacts occur in acquired images. Such noise and artifacts raise considerable problems from the perspective of signal to noise ratio (hereinafter abbreviated as S/N ratio) in a radiation imaging apparatus in which imaging is carried out with a relatively small amount of radiation rays, since image signals must be acquired with weak radiation rays or light resulting from such radiation rays.

At a stage subsequent to the reading circuit, analog-to-digital converters (hereinafter abbreviated as A/D converters) that convert analog signals that have been read into digital signals are provided. The number of the A/D converters provided is determined in accordance with the number of pixels in the FPD and the reading period. Thus, during moving-picture imaging, in which images are read rapidly, a large number of A/D converters is needed, so that power consumption and heat generation are intense similarly to the operational amplifiers. In the A/D converters, the characteristics of analog-to-digital conversion could vary due to temperature change associated with heat generation. The variation in the analog-to-digital conversion characteristics could cause a variation among images acquired successively, so that discontinuity could occur in a moving picture.

Furthermore, at a subsequent stage of the A/D converters, signal transmitters that transmit digital signals to an image processor in the system are provided. The number of the signal transmitters provided is determined in accordance with the number of pixels in the FPD, the reading period, and the number of the A/D converters. Thus, during moving-picture imaging, in which images are read rapidly, a large number of signal transmitters is needed. This also increases power consumption and heat generation.

The present invention provides a radiation imaging apparatus that is capable of taking a moving picture without generating artifacts or causing unnaturalness in images, and while suppressing heat generation by a reading circuit including operational amplifiers and by an A/D converter during moving-picture imaging such as fluoroscopy. Furthermore, the present invention provides a radiation imaging apparatus that is capable of taking a moving picture without generating artifacts and while suppressing heat generation by a signal transmitter during moving-picture imaging.

According to an aspect of the present invention, there is provided a radiation imaging apparatus capable of taking a moving picture by acquiring a plurality of radiation image signals on the basis of a plurality of times of irradiation with radiation rays, the radiation imaging apparatus including a radiation detector having a two-dimensional array of pixels, the radiation detector being configured to detect electric signals based on incident radiation rays; a reading circuit configured to read the electric signals; an analog-to-digital converter configured to convert the electric signals read by the reading circuit into digital signals; and a controller configured to switch an operation status of the analog-to-digital converter so that power consumption of the analog-to-digital-converter is reduced in a period between a start of an n-th time of irradiation with radiation rays and a start of an (n+1)-th time of irradiation with radiation rays, where n is a natural number.

According to another aspect of the present invention, there is provided a method of controlling a radiation imaging apparatus capable of taking a moving picture by acquiring a plurality of radiation image signals on the basis of a plurality of times of irradiation with radiation rays, the radiation imaging apparatus including a radiation detector having a two-dimensional array of pixels, the radiation detector being configured to detect electric signals based on incident radiation rays, a reading circuit configured to read the electric signals, and an analog-to-digital converter configured to convert the electric signals read by the reading circuit into digital signals, the method including the step of switching an operation status of the analog-to-digital converter so that power consumption of the analog-to-digital-converter is reduced in a period between a start of an n-th time of irradiation with radiation rays and a start of an (n+1)-th time of irradiation with radiation rays, where n is a natural number.

According to the present invention, during moving-picture imaging, in a period between a start of an n-th time of irradiation with radiation rays and a start of an (n+1)-th time of irradiation with radiation rays, where n is a natural number, it is possible to control power consumption of the analog-to-digital converter. Thus, it is possible to suppress heat generation by the analog-to-digital converter, thereby suppressing temperature rise in the radiation imaging apparatus. Furthermore, favorable radiation images can be obtained by suppressing noise and artifacts associated with heat generation by the analog-to-digital converter.

Further features of the present invention will become apparent from the following description of exemplary embodiments with reference to the attached drawings.

DESCRIPTION OF THE EMBODIMENTS

Now, embodiments of the present invention will be described in detail with reference to the drawings.

First Embodiment

Figure 1:
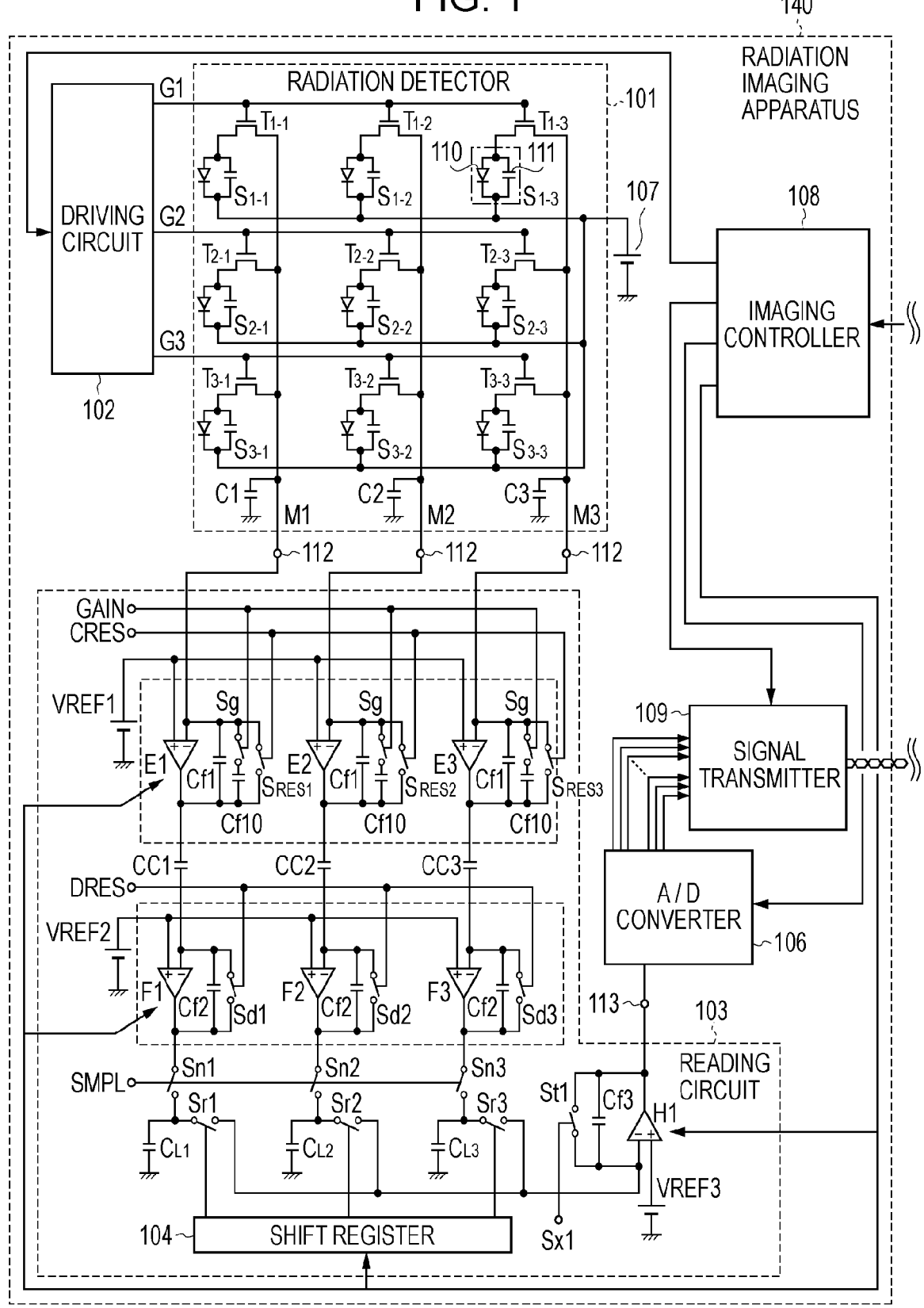
FIG. 1 is a schematic equivalent of a circuit diagram of a radiation imaging apparatus according to a first embodiment of the present invention.

FIG. 1 is a schematic diagram showing an equivalent circuit of a radiation imaging apparatus according to a first embodiment of the present invention. The radiation imaging apparatus is capable of operating in a moving-picture taking mode for fluoroscopy or the like and a still-picture taking mode for ordinary imaging as selected. In FIG. 1, phosphor members, which function as a wavelength converter that converts radiation rays into visible light, is not shown.

Referring to FIG. 1, a radiation detector 101 detects radiation rays. In each of a plurality of photoreceptor regions 110, light obtained by wavelength conversion of radiation rays is converted into corresponding charges. The charges obtained by photoelectric conversion in the photoreceptor regions 110 are accumulated in inter-electrode capacitors 111. The radiation detector 101 includes photoelectric converter elements S1-1 to S3-3 each including one of the photoreceptor regions 110 and one of the inter-electrode capacitors 111. The photoelectric converter elements S1-1 to S3-3 together with phosphor members (not shown) provided on light-incident sides thereof function as converters that convert radiation rays into charges. The radiation detector 101 also includes switching elements T1-1 to T3-3 that transfer electric signals based on the charges obtained by the photoelectric converter elements S1-1 to S3-3 to signal lines M1 to M3. The signal line M1 is connected to either source electrodes or drain electrodes of the switching elements T1-1 to T3-1 arrayed in a column direction. The photoelectric converter element S1-1 and the switching element T1-1 form a pixel. The switching elements T1-1 to T3-3 are driven via driving lines G1 to G3. The driving line G1 is connected to gate electrodes of the switching elements T1-1 to T1-3 arrayed in a row direction. The signal lines M1 to M3 have load capacitors C1 to C3 attached thereto. The photoelectric converter elements S1-1 to S3-3 are implemented, for example, by metal-insulator-semiconductor (MIS) or positive-intrinsic-negative (PIN) thin-film photoelectric converter elements based on hydrogenated amorphous silicon films, or PN photodiodes based on single-crystal silicon. The switching elements T1-1 to T3-3 are implemented by, for example, thin-film transistors based on amorphous silicon, polycrystalline silicon, or single-crystal silicon, or existing metal-oxide-semiconductor (MOS) transistors. In this embodiment, a flat-panel radiation detector having thin-film transistors and converters including photoelectric converter elements based on amorphous silicon on an insulating substrate composed of glass or the like is used. Although the radiation detector 101 in this embodiment is shown as including a two-dimensional array of 3×3=9 pixels for simplicity of description, without limitation, a larger number of pixels may be provided, depending on the application.

The driving lines G1 to G3 receive driving signals from a driving circuit (shift register) 102. In order to enable photoelectric conversion by the photoelectric converter elements S1-1 to S3-3, a bias power supply 107 applies a bias Vs to the photoelectric converter elements S1-1 to S3-3.

When the photoelectric converter elements S1-1 to S3-3 and the switching elements T1-1 to T3-3 are implemented by thin-film elements, for example, the driving circuit 102 can be implemented by one or more IC chips based on single-crystal silicon. Similarly, a reading circuit, described below, can be implemented by one or more IC chips based on single-crystal silicon transistors.

The signal lines M1 to M3 are individually connected to terminals 112. A reading circuit 103 converts electric signals transferred thereto in parallel via the signal lines M1 to M3 and the terminals 112 into series signals. The terminals 112 are connected to first operational amplifiers E1 to E3, provided at a first stage as viewed from the terminals 112. Each of the operational amplifiers E1 to E3 includes a first integrating capacitor Cf1 connected between an inverting input terminal and an output terminal of the operational amplifier, a first reset switch SRES1, SRES2, or SRES3 for resetting the first integrating capacitor Cf1, a first attached integrating capacitor Cf10 connected in parallel to the first integrating capacitor Cf1, and a variable-gain switch Sg for turning the first attached integrating capacitor Cf10 ON or OFF. The reset switches SRES1 to SRES3 receive a control signal CRES. The variable-gain switches Sg are controlled according to an external control signal GAIN. A first reference voltage is applied by a first reference power supply VREF1 to non-inverting input terminals of the first operational amplifiers E1 to E3. Capacitors CC1 to CC3 are provided between output terminals of the first operational amplifiers E1 to E3 and sampling switches Sn1 to Sn3, so that only AC components of signals are transmitted. The capacitors CC1 to CC3 are connected to inverting input terminals of second operational amplifiers F1 to F3. Each of the second operational amplifiers F1 to F3 includes a second integrating capacitor Cf2 connected between the inverting input terminal and an output terminal, and a second reset switch Sd1, Sd2, or Sd3 for resetting the second integrating capacitor Cf2. The second reset switches Sd1 to Sd3 are controlled according to a control signal DRES. A second reference voltage is applied by a second reference power supply VREF2 to non-inverting input terminals of the second operational amplifiers F1 to F3. Signals output from the first operational amplifiers E1 to E3 are sampled by sampling switches Sn1 to Sn3 and sampling capacitors CL1 to CL3, respectively. Each of the sampling switches Sn1 to Sn3 and a corresponding one of the sampling capacitors CL1 to CL3 constitutes a sample-and-hold circuit. The sampling switches Sn1 to Sn3 receive sampling pulses SMPL. Signals output from the sampling capacitors CL1 to CL3 are read sequentially by read switches Sr1 to Sr3 to form series signals. The read switches Sr1 to Sr3 are sequentially driven by a shift register 104. The read switches Sr1 to Sr3 and the shift register 104 constitute an analog multiplexer. Output ends of the read switches Sr1 to Sr3 are commonly connected to an inverting input terminal of a third operational amplifier H1. The third operational amplifier H1 includes a third integrating capacitor Cf3 connected between the inverting input terminal and an output terminal of the third operational amplifier H1, and a third reset switch St1 for resetting the third integrating capacitor Cf3. The third reset switch St1 is controlled according to a control signal Sx1. A third reference voltage is applied by a third reference power supply VREF3 to a non-inverting input terminal of the third operational amplifier H1.

Analog electric signals read by the reading circuit 103 are converted into digital signals by an analog-to-digital converter (hereinafter abbreviated as A/D converter) 106. The digital signals obtained through the conversion by the A/D converter 106 are transmitted to an image processor (not shown) provided externally to the radiation imaging apparatus by a signal transmitter 109.

The operation status of the driving circuit 102, the reading circuit 103, the A/D converter 106, and the signal transmitter 109 is controlled by an imaging controller 108. The control of the operation status will be described later in detail.

Figure 2:
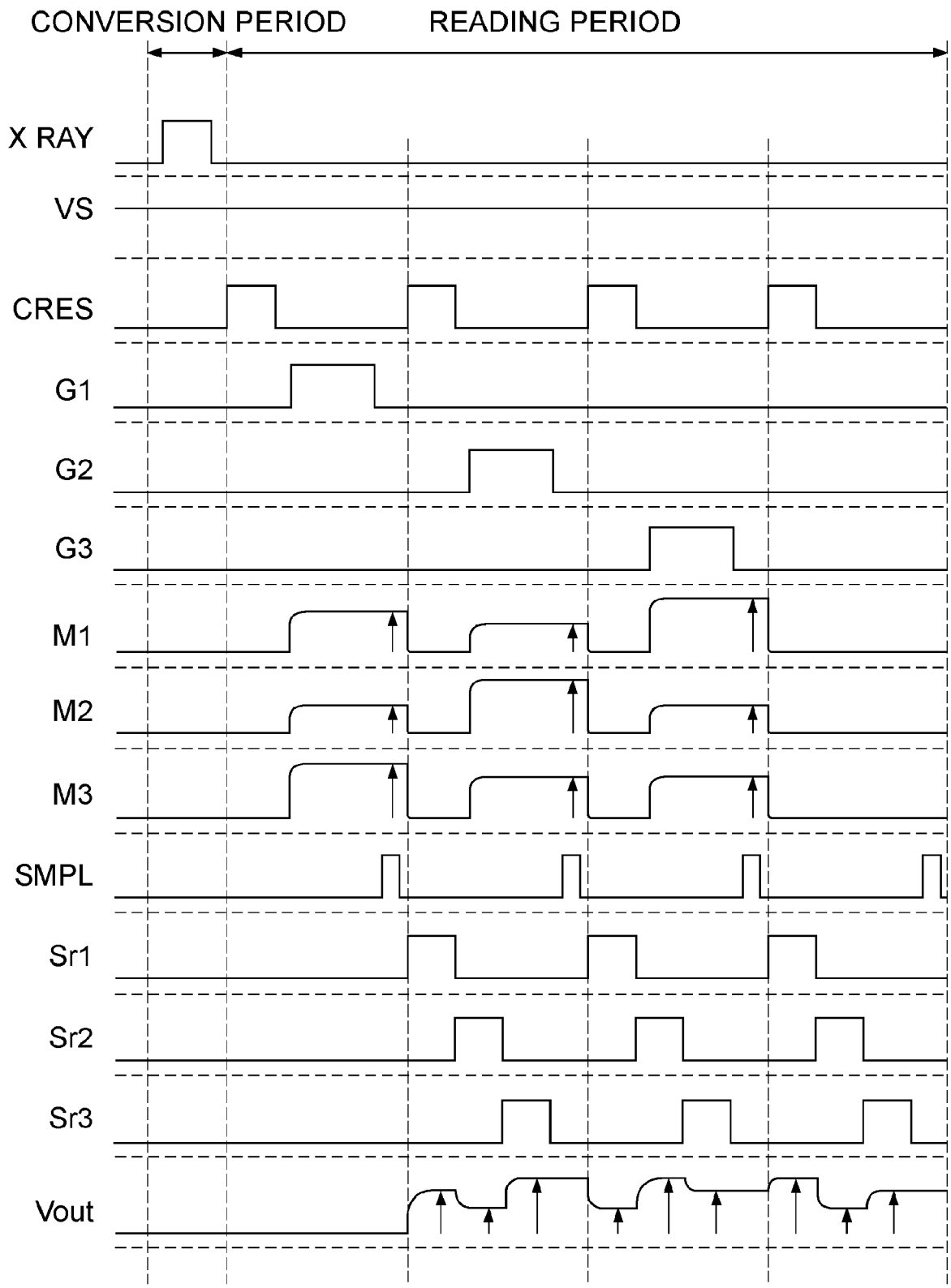
FIG. 2 is a timing chart for schematically explaining an operation for reading signals from the radiation imaging apparatus according to the first embodiment.

FIG. 2 is a timing chart for schematically explaining an operation for reading signals from the radiation imaging apparatus according to this embodiment. Now, the reading operation of the radiation imaging apparatus according to this embodiment will be described with reference to FIGS. 1 and 2.

First, an operation in a conversion period (irradiation period) will be described. When radiation pulses are emitted toward the radiation imaging apparatus with the switching elements T1-1 to T3-3 all turned OFF, the photoelectric converter elements S1-1 to S3-3 of the individual pixels are irradiated with light resulting from the radiation pulses converted by the phosphor members (not shown). Then, charges corresponding to the amounts of light occur at the photoelectric converter elements S1-1 to S3-3, and the charges are accumulated in the inter-electrode capacitors 111. Even after the radiation is stopped, the charges obtained through the photoelectric conversion remain stored in the inter-electrode capacitors 111. The conversion period is a period in which radiation rays with which the converters including the photoelectric converter elements S1-1 to S3-3 are irradiated can be converted into corresponding charges, and includes an irradiation period in which the converters are irradiated with radiation rays.

Next, an operation performed in a reading period will be described. The reading operation is executed sequentially on a row-by-row basis, in order of the photoelectric converter elements S1-1 to S1-3 in the first row, the photoelectric converter elements S2-1 to S2-3 in the second row, and the photoelectric converter elements S3-1 to S3-3 in the third row. First, in order to read signals from the photoelectric converter elements S1-1 to S1-3 in the first row, the driving circuit 102 supplies driving signals to the driving line G1 connected to the switching elements T1-1 to T1-3 in the first row. Then, the switching elements T1-1 to T1-3 in the first row are turned ON, so that analog electric signals based on the charges generated by the photoelectric converter elements S1-1 to S1-3 in the first row are transferred to the reading circuit 103 via the signal lines M1 to M3. The electric signals transferred to the reading circuit 103 are amplified by the first operational amplifiers E1 to E3 and the second operational amplifiers F1 to F3. The amplified signals are transferred to and stored in the sampling capacitors CL1 to CL3 of the sample-and-hold circuits via the sampling switches Sn1 to Sn3. Then, the read switches Sr1 to Sr3 are sequentially turned ON by the shift register 104, whereby signals output from the sampling capacitors CL1 to CL3 are sequentially fed to the third operational amplifier H1 in the form of series signals, and the amplified signals are output from the reading circuit 103. The reading operation is similarly executed for the second row and the third row, whereby image signals (radiation image signals) for one picture are obtained. Although the electric signals are voltages based on charges in this embodiment, alternatively, current amplifiers may be used. In that case, the electric signals are currents based on charges. The reading period is a period in which the reading circuit 103 executes the reading operation to obtain image signals for one picture from the radiation detector 101.

The analog series signals for one row, read from the reading circuit 103, are converted into digital signals by the A/D converter 106. The digital signals are transmitted to an image processor, provided externally to the radiation imaging apparatus, by the signal transmitter 109. The operation for the analog-to-digital conversion performed by the A/D converter and the operation for transmission of the digital signals from the signal transmitter 109 may be executed in either the same reading period or different reading periods. For example, these operations need not be executed in the same reading period when a storage device, such as an analog frame memory, is provided between the reading circuit 103 and the A/D converter 106.

Next, an operation for controlling power consumption in the radiation imaging apparatus according to this embodiment will be described in detail with reference to FIGS. 3 and 4.

Figure 3:
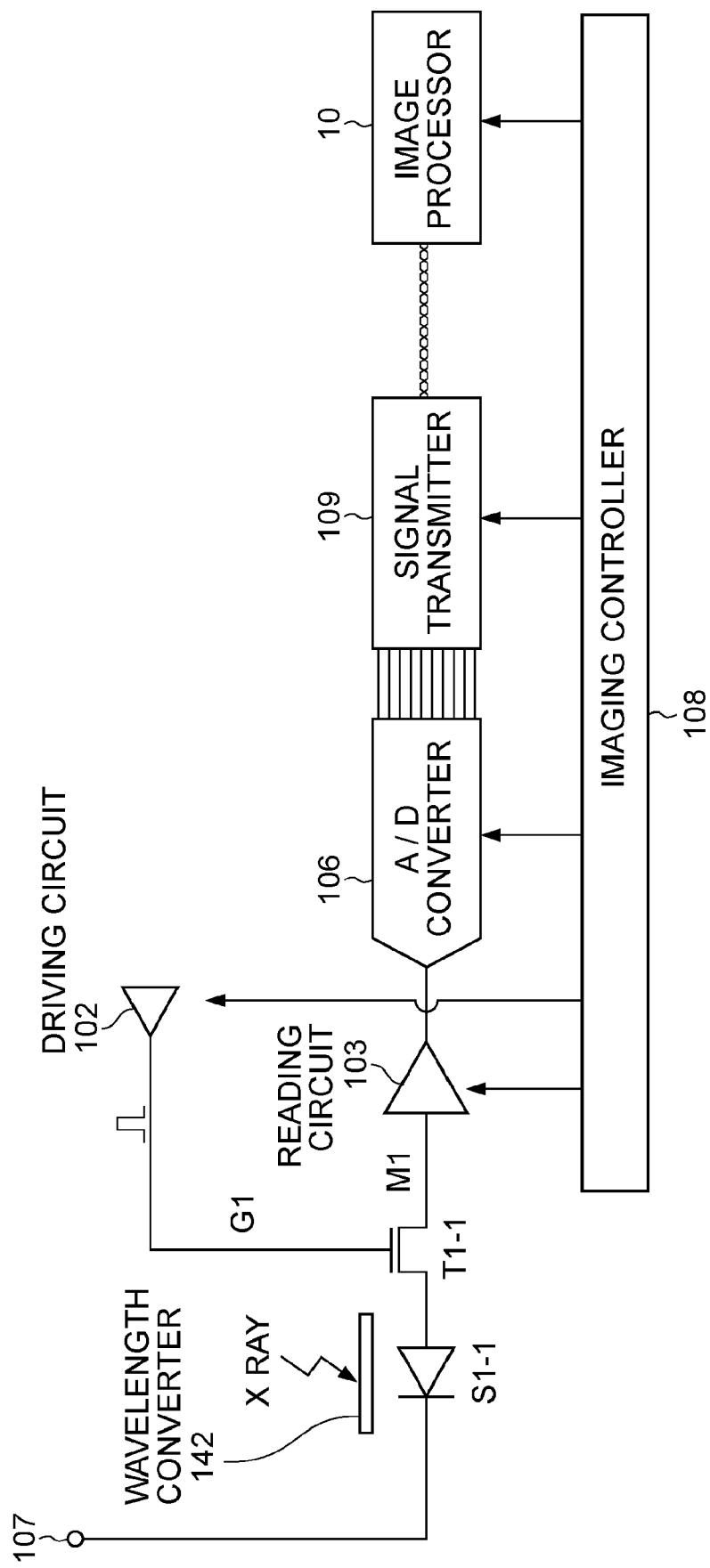
FIG. 3 is a schematic circuit diagram of one pixel in the radiation imaging apparatus according to the first embodiment.
Figure 4:
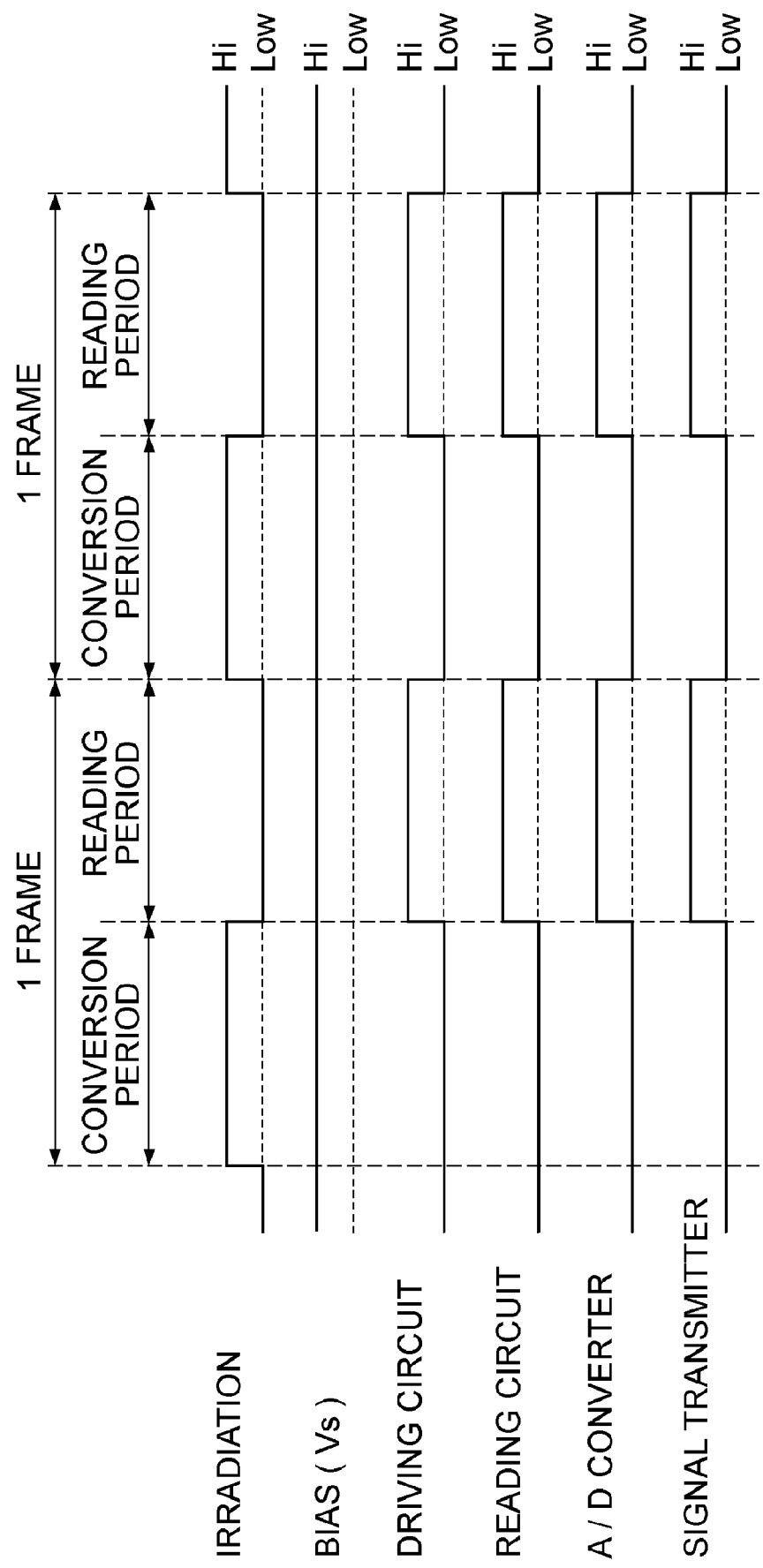
FIG. 4 is a timing chart schematically showing an operation of one pixel in the radiation imaging apparatus according to the first embodiment.

FIG. 3 is a schematic circuit diagram of one pixel in the radiation imaging apparatus according to this embodiment. FIG. 4 is a timing chart schematically showing an operation of one pixel in the radiation imaging apparatus according to this embodiment.

In FIG. 3, elements designated by the same numerals as in FIG. 1 correspond to the elements shown in FIG. 1, so that description thereof will be omitted. An image processor 10 is provided externally to the radiation imaging apparatus, and includes a signal receiver that receives digital signals transmitted from the signal transmitter 109. A wavelength converter 142 converts incident radiation rays into light having a wavelength in a range detectable by the photoelectric converter elements S1-1 to S3-3. As the wavelength converter 142, a phosphor that emits light by a base material, such as $Gd_2O_3$ or $CdWO_4$, or a phosphor that emits light by utilizing an activating material included in a base material, such as CsI:Tl, may be used.

In this embodiment, when the radiation detector 101 is irradiated with radiation rays a plurality of times, the imaging controller 108 switches the operation status of the reading circuit 103 so that power consumption of the reading circuit 103 is reduced in a period of one frame between the start of an n-th time of irradiation (n is a natural number) and the start of an (n+1)-th time of irradiation. Furthermore, similarly, the imaging controller 108 switches the operation status of the A/D converter 106 and the signal transmitter 109 so that power consumption of the A/D converter 106 and the signal transmitter 109 is reduced in the period of one frame. Furthermore, the imaging controller 108 switches the operation status of the driving circuit 102 so that power consumption of the driving circuit 102 is reduced in the period of one frame. FIG. 4 is a timing chart schematically showing an operation according to this embodiment.

In this embodiment, when the radiation detector 101 is irradiated with radiation rays a plurality of times, in a period of one frame between the start of an n-th time of irradiation (n is a natural number) and the start of an (n+1)-th time of irradiation, the radiation imaging apparatus executes the operation of one conversion period (irradiation period) and one reading period. In the conversion period (irradiation period), the bias Vs for enabling photoelectric conversion is applied to the converters, and the converters are irradiated with radiation rays so that the radiation rays are converted into charges. In the reading period, at least the driving circuit 102 and the reading circuit 103 are activated so that electric signals are read from the radiation detector 101. The operation for analog-to-digital conversion performed by the A/D converter 106 and the operation for transmission of digital signals from the signal transmitter 109 can be executed in a reading period, but not necessarily. Referring to FIG. 4 showing a schematic timing chart, when at Hi (high) level, each of the radiation detector 101, the driving circuit 102, the reading circuit 103, the A/D converter 106, and the signal transmitter 109 is enabled and operates normally. On the other hand, when at Low level, each of the driving circuit 102, the reading circuit 103, the A/D converter 106, and the signal transmitter 109 is not powered on or is disabled. In the conversion period (irradiation period), it is possible to convert radiation rays into charges when the bias Vs is applied to the converters. Thus, the driving circuit 102, the reading circuit 103, the A/D converter 106, or the signal transmitter 109 need not be activated in the conversion period (irradiation period). If the driving circuit 102, the reading circuit 103, the A/D converter 106, or the signal transmitter 109 is activated in the conversion period (irradiation period), power is wasted. Particularly, power should not be wasted by the reading circuit 103 and the A/D converter 106, with which power consumption and associated heat generation are intense. Furthermore, when heat generation by the reading circuit 103 is intense, the amount of noise (thermal noise or the like) fluctuates. Similarly, when heat generation by the A/D converter 106 is intense, analog-to-digital conversion characteristics could fluctuate. That is, when heat generation by the reading circuit 103 and the A/D conversion 106 is intense, discontinuity could occur in pictures that are obtained successively. Thus, in this embodiment, in order to reduce consumption of power during acquisition of a moving picture, in the conversion period, the imaging controller 108 at least causes the reading circuit 103 to operate in such a manner that power consumption of the reading circuit 103 is reduced. More specifically, in the conversion period (irradiation period), the imaging controller 108 controls at least the reading circuit 103 so that the reading circuit 103 is not powered on or is disabled. Furthermore, in the conversion period (irradiation period), the imaging controller 108 exercises control so that the driving circuit 102, the A/D converter 106, and the signal transmitter 109 are not powered on or are disabled. By exercising control in this manner, for example, when the duty ratio of the conversion period and the reading period is 1:1, compared with a case where the above components are constantly enabled, power consumption and heat generation can be reduced to half. Furthermore, instead of switching driving between the conversion period and the reading period in each frame, by controlling the operation on a line-by-line basis, power consumption can be reduced further.

Next, switching of power consumption in each of the driving circuit 102, the reading circuit 103, the A/D converter 106, and the signal transmitter 109 will be described. Each of these units can be caused to enter an operation status for reducing power consumption by powering off the unit, reducing the voltage of an operation power supply, limiting a current from a current source, leaving an output terminal open, or reducing the clock frequency or using DC.

Figure 5:
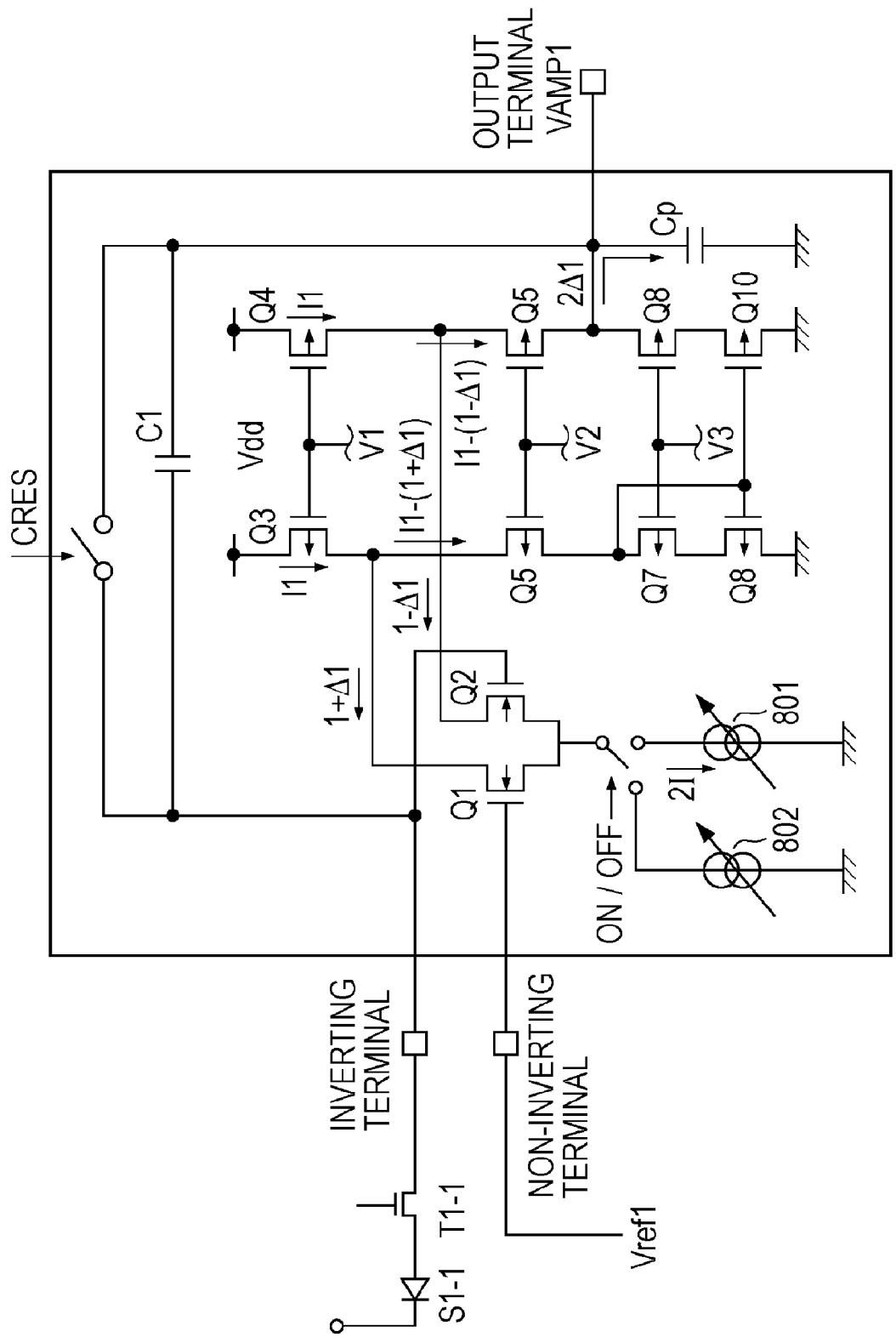
FIG. 5 is a schematic equivalent circuit diagram for explaining switching of power consumption of an amplifier.

FIG. 5 is a schematic equivalent circuit diagram for explaining switching of power consumption of an amplifier, using the first amplifier as an example. The current output from the amplifier is determined by current sources 801 and 802 (current sources for Q3 and Q4 each output an amount of current corresponding to half the amount of current output from the current source 801). The time it takes to reset the signal line and the first integrating capacitor Cf1 to the reference potential Vref1 depends on the amounts of currents supplied from the current sources 801 and 802, and the time for resetting the integrating capacitor Cf and the stray capacitor of the signal line is reduced as the amounts of currents become larger. However, the currents are maintained to flow even in non-reset periods, such as the irradiation period, so that power consumption increases. Thus, in periods other than the reading period in each frame, the current source is switched from the current source 801 to the current source 802 with a smaller amount of output current, so that the amount of current is reduced and therefore power consumption is reduced. In this embodiment, the current source 801 is configured to output an amount of current with which the amplifier can execute a normal amplification operation, and the current source 802 is configured to output an amount of current less than the amount of current output from the current source 801, with which the amplifier is not allowed to execute a normal amplification operation. Furthermore, without limitation to switching of current sources, for example, power consumption may be reduced by switching the power supply voltage Vdd of the operation power supply. For example, the power supply voltage may be switched so that a recommended operation voltage of the amplifier, e.g., 5 V, is supplied in the reading period while a minimum operation voltage of the amplifier, e.g., 1V, is supplied in periods other than the reading period in each frame.

Figure 6A:
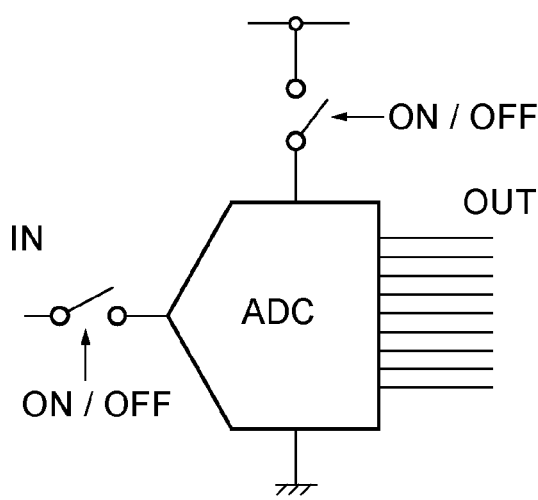
FIGS. 6A to 6D are schematic circuit diagrams for explaining methods for switching current consumption (power consumption) of an A/D converter in a frame.
Figure 6B:
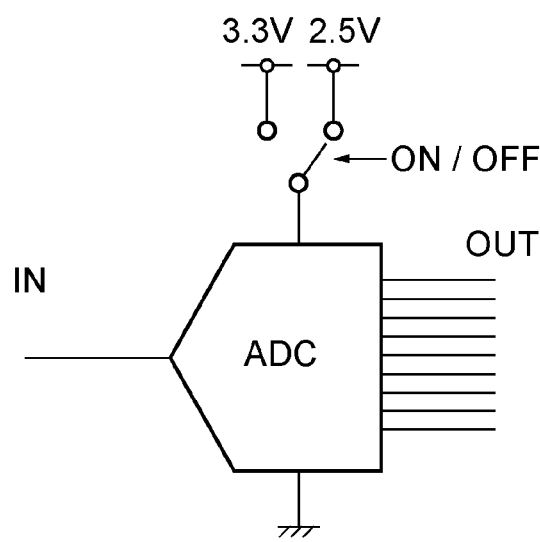
Figure 6C:
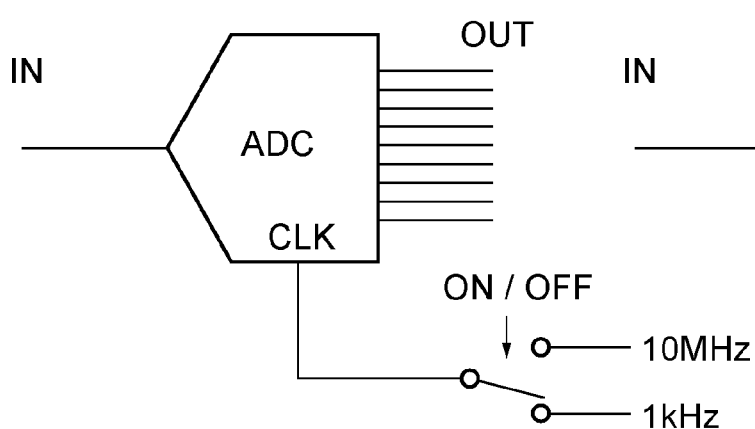
Figure 6D:
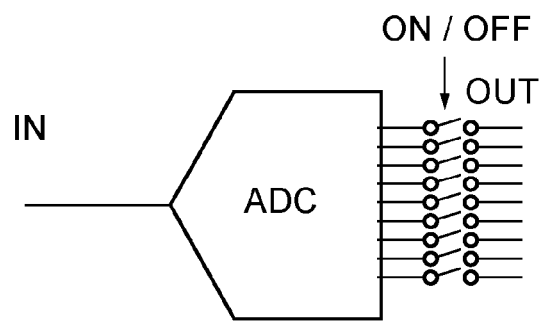

Next, methods of switching current consumption (power consumption) of the A/D converter 106 in one frame will be described with reference to FIGS. 6A to 6D. FIG. 6A shows a method of reducing current consumption and power consumption by switching ON/OFF of power of the A/D converter 106. In this case, since the device gets broken when a voltage is applied to the input, the input terminal is left open. FIG. 6B shows a method of reducing current consumption by switching the power supply voltage. For example, when the A/D converter 106 executes A/D conversion in the same reading period in synchronization with the reading circuit 103, in the reading period, the A/D converter 106 is driven with a recommended operation voltage, e.g., 3.3 V. On the other hand, in the inactive period other than the reading period in each frame, the A/D converter 106 is driven with a minimum operation voltage, e.g., 2.5 V, so that power consumption is reduced. FIG. 6C shows a method in which the clock signal input to the A/D converter 106 is switched. Power consumption depends on the frequency of the input clock signal, i.e., the driving frequency of the A/D converter 106. Thus, in the inactive period other than the reading period in each frame, the clock frequency is reduced or the clock is changed to DC, so that current consumption is reduced. FIG. 6D shows a method of reducing current consumption by leaving the output terminal of the A/D converter 106 open in the inactive period other than the reading period in each frame, so that the amount of current output from the A/D converter 106 and current consumption is reduced. The present invention is not limited to the methods described above, and any method can be employed as long as power consumption of the A/D converter 106 can be reduced.

Furthermore, the signal transmitter 109 or the driving circuit 102 can also reduce current consumption by switching the operation status between the reading period and the non-reading period in each frame according to any one of the methods described above. By exercising control to switch current consumption and power consumption in each frame by the methods described above, current consumption, power consumption, and heat generation of each component can be reduced.

Figure 7:
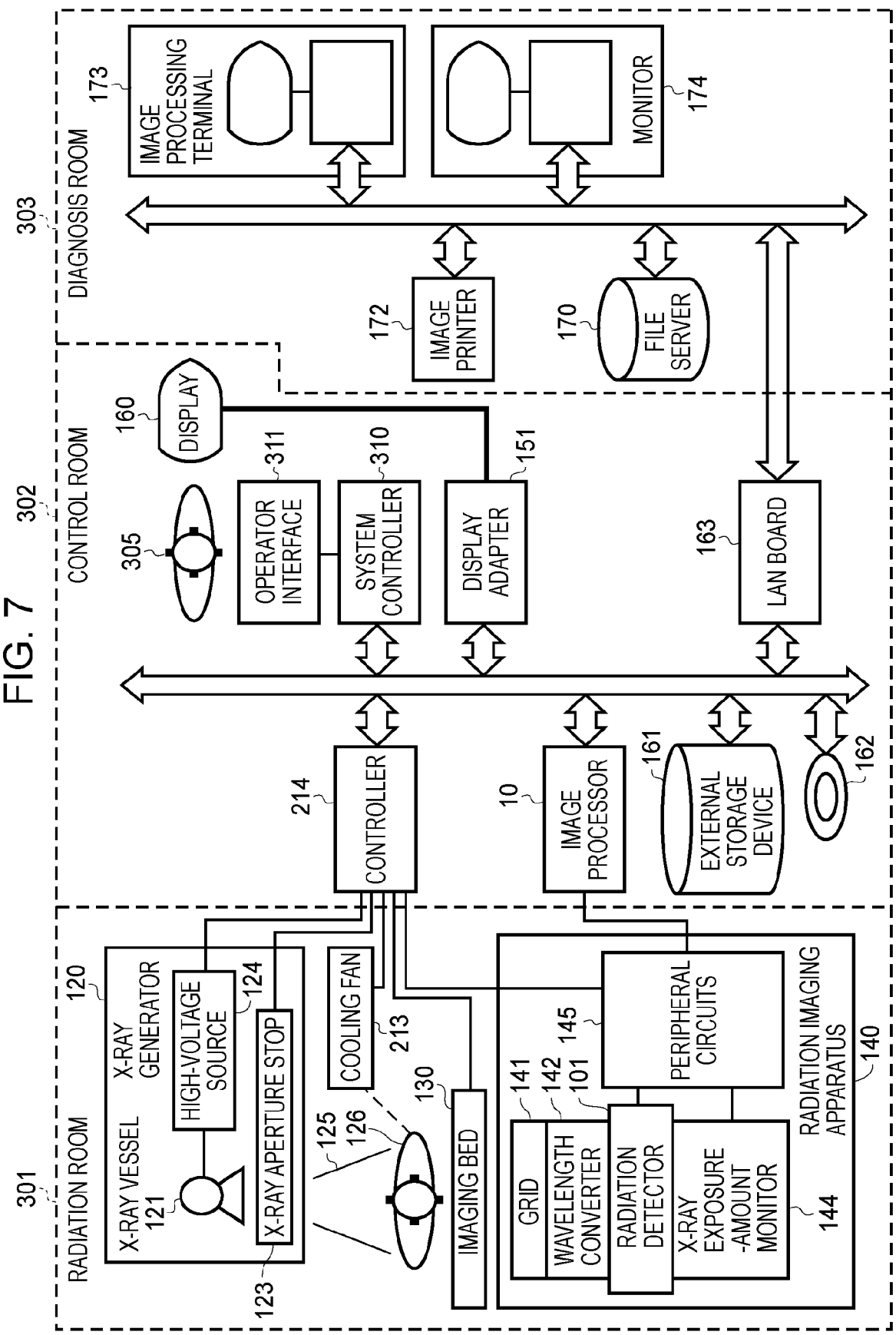
FIG. 7 is a schematic diagram of a radiation imaging system according to an embodiment of the present invention.

Next, a radiation imaging system according to this embodiment will be described with reference to FIG. 7. FIG. 7 is a schematic diagram showing the radiation imaging system according to this embodiment.

The radiation imaging system includes a radiation (X-ray) room 301, a control room 302, and a diagnosis room 303. The overall operation of the radiation imaging system is controlled by a system controller 310. An operator interface 311 includes, for example, a touch panel on a display, a mouse, a keyboard, a joystick, a fit switch, etc. The operator interface 311 allows setting of imaging conditions (still picture or moving picture, tube voltage, tube current, irradiation time, etc.), imaging timing, image processing conditions, subject ID, method of processing acquired image, etc. The system controller 310 instructs imaging conditions based on an instruction by an operator 305 or a radiation information system to a controller 214 that controls the sequence of radiation imaging, and thereby acquires data. On the basis of the instruction, the controller 214 drives an X-ray generator 120, an imaging bed 130, and a radiation imaging apparatus 140 to acquire image data, and transfers the image data to the image processor 10. Then, the image data is processed as specified by the operator 305, and the resulting image is displayed on a display 160. At the same time, raw data that has undergone basic image processing, such as offset correction, white correction, and defect correction, is saved in an external storage device 161. Furthermore, on the basis of the instruction from the operator 305, for example, the system controller 310 processes or displays the image again, transfers the image data to and saves the image data in a device on the network, displays the image on the display 160 or prints the image on a film. The operation of switching power consumption is controlled according to an instruction issued from the controller 214 to the imaging controller 108 provided in a peripheral circuit 145 of the radiation imaging apparatus 140. The imaging controller 108 switches the operation status of the driving circuit 102, the reading circuit 103, the A/D converter 106, and the signal transmitter 109 according to the instruction.

Next, the operation of the system will be described below on the basis of the flow of signals. The X-ray generator 120 includes an X-ray vessel 121 and an X-ray aperture stop 123. The X-ray vessel 121 is driven by a high-voltage generator 124 controlled by the controller 214, and emits X-ray beams 125. The X-ray aperture stop 123 is driven by the controller 214, and shapes the X-ray beams in accordance with changes in the imaging region so that unnecessary X-ray irradiation is avoided. The X-ray beams are directed toward a subject 126 lying on the X-ray-transmitting imaging bed 130. The imaging bed 130 is driven according to instructions from the controller 214. The X-ray beams 125 are transmitted through the target 126 and the imaging bed 130 and irradiate the radiation imaging apparatus 140. The radiation imaging apparatus 140 includes a grid 141, the wavelength converter 142, the radiation detector 101, an X-ray exposure-amount monitor 144, and a peripheral circuit 145. The grid 141 reduces the effect of X-ray scattering caused by transmission through the subject 126. The grid 141 is composed of a non-highly X-ray absorbing material and a highly X-ray absorbing material, and has a stripe structure formed of, for example, Al and Pb. In order to prevent moiré due to the grid ratio between the radiation detector 101 and the grid 141, the grid 141 is caused to vibrate according to an instruction from the controller 214 during irradiation with X rays. The radiation detector 101 is disposed adjacent to the wavelength converter 142. The radiation detector 101 converts photons into charges and outputs electric signals. The X-ray exposure-amount monitor 144 monitors the amount of X rays that are transmitted. The X-ray exposure-amount monitor 144 may detect X rays directly using, for example, photoreceptor elements composed of crystal silicon, or detect light transmitting through the radiation detector 101 from the wavelength converter 142. In this embodiment, visible light transmitting through the radiation detector 101 (proportional to the amount of X rays) is detected by the X-ray exposure-amount monitor 144, corresponding information is supplied to the controller 214, and the controller interrupts or adjusts the X rays by driving the high-voltage generator 124 according to the information. The peripheral circuit 145 includes the driving circuit 102, the reading circuit 103, the A/D converter 106, the imaging controller 108, and the signal transmitter 109. According to an instruction issued from the controller 214, the imaging controller 108 switches the operation status of the driving circuit 102, the reading circuit 103, the A/D converter 106, and the signal transmitter 109 by one of the methods described earlier so that power consumption is reduced. Although the imaging controller 108 is provided in the radiation imaging apparatus in this embodiment, without limitation, the imaging controller 108 may be provided in the controller 214.

Image signals supplied from the radiation imaging apparatus 140 are transferred by the signal transmitter 109 from the X-ray room 301 to the image processor 10 in the X-ray control room 302. At the time of this transfer, since considerable noise occurs in the X-ray room 301 due to generation of X rays, error due to the noise could occur in the image data transferred. Thus, it is necessary to enhance noise endurance on the transfer path. For example, an optical fiber transfer path employing a differential signal transmission method, such as low voltage differential signaling (LVDS), is used so that the transmission system is provided with error correcting capability. The image processor 10 switches display data according to instructions from the controller 214. Furthermore, the image processor 10 can execute correction of image data (offset correction, white correction, defect correction), spatial filtering, recursive processing, or the like in real time, and can also execute gray-scaling, scatter-line correction, various processing based on spatial frequencies, etc.

The image that has been processed is displayed on the display 160 via a display adapter 151. Furthermore, simultaneously with the real-time image processing, a base image that has undergone only data correction is saved in the external storage device 161. As the external storage device 161, a data storage device with a large capacity, high speed, and high reliability is suitable. For example, a hard disk array, such as a redundant array of inexpensive disks (RAID), can be used. Furthermore, according to an instruction by an operator, image data stored on the external storage device 161 can be reconfigured so as to satisfy a predetermined standard (e.g., IS & C) and saved on an external storage device. The external storage device is, for example, a magneto-optical disk 162, a hard disk in a file server 170 on a local area network (LAN), or the like. The radiation imaging apparatus according to this embodiment can be connected to a LAN via a LAN board 163, and has data compatibility with a hospital information system (HIS). The LAN can be connected to a plurality of radiation imaging systems, and also to a monitor 174 for displaying moving pictures and still pictures, the file server 170 for filing image data, etc. Furthermore, the LAN can be connected to an image printer 172 that outputs images to films, an image processing terminal 173 for executing complex image processing or providing diagnosis assistance, etc. The radiation imaging system according to this embodiment outputs image data according to a predetermined protocol (e.g., DICOM). Furthermore, real-time remote diagnosis by a doctor is allowed at the time of X-ray imaging using a monitor connected to the LAN.

Second Embodiment

Figure 8:
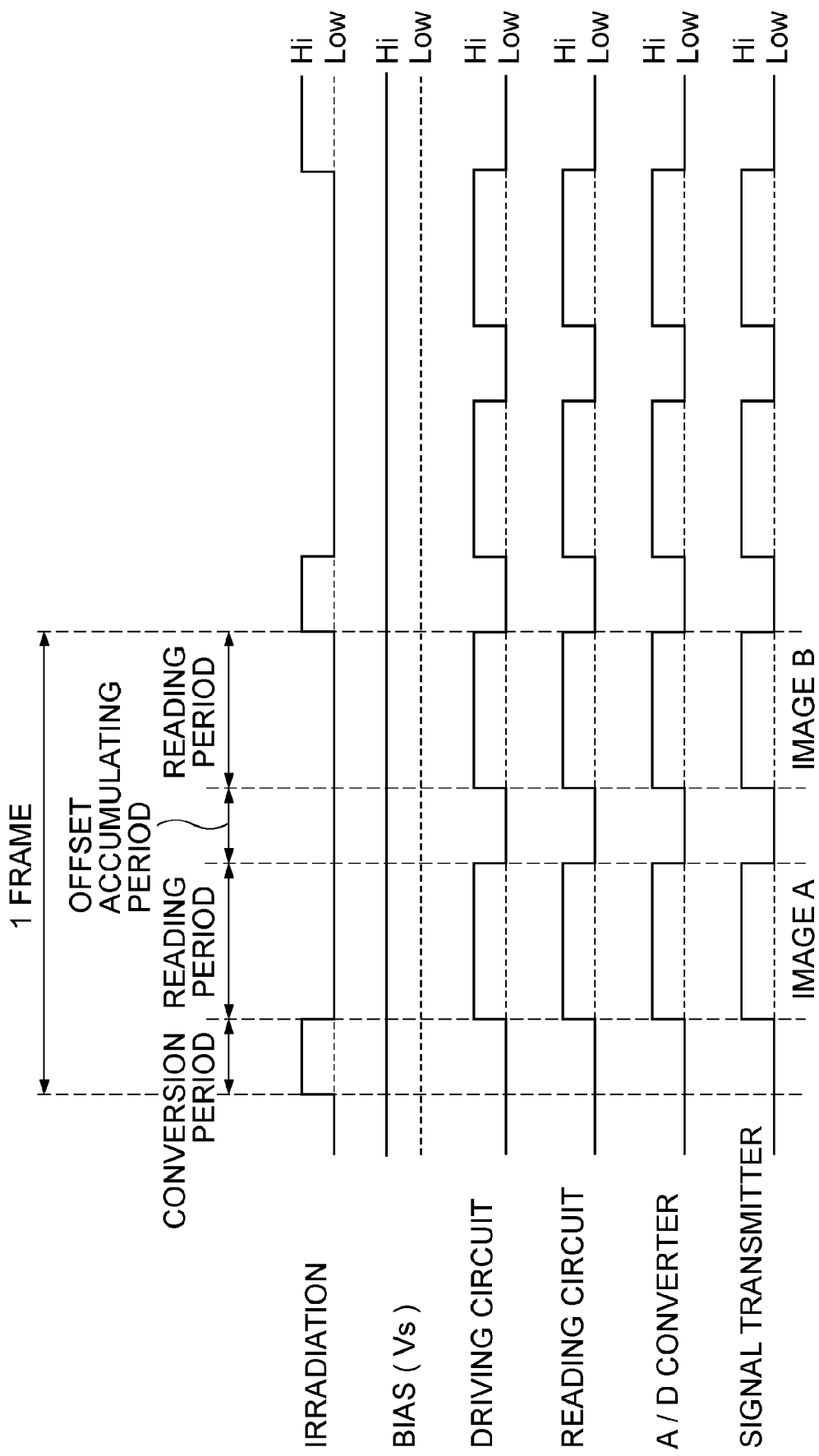
FIG. 8 is a timing chart schematically showing an operation of one pixel in a radiation imaging apparatus according to a second embodiment of the present invention.

Next, a second embodiment of the present invention will be described with reference to FIG. 8. FIG. 8 is a timing chart schematically showing states of operation in this embodiment. Since the configurations of the radiation imaging apparatus and the radiation imaging system are the same as in the first embodiment, description thereof will be omitted.

In the first embodiment, each frame includes a conversion period (irradiation period) and a reading period. In contrast, in the second embodiment, each frame includes four periods, namely, an offset accumulating period and an offset reading period in addition to the conversion period (irradiation period) and the reading period. The offset accumulating period is a waiting period having the same length as the conversion period (irradiation period), without irradiation with radiation rays. In the radiation imaging apparatus, an offset attributable to a dark component of the converter or an offset component of the reading circuit could vary. Thus, by subtracting an offset from each frame, images with high quality can be obtained. Referring to FIG. 8, an image A is composed of radiation image signals acquired with irradiation, an image B is composed of offset image signals acquired without irradiation, and processing is executed to obtain a difference by subtracting the image B from the image A. When obtaining the offset image signals, by obtaining an image under the same operation status during a period with the same length as the conversion period for the radiation image signals, dark current components of the converter can be obtained substantially equally as in the case of radiation image signals. This serves to cancel the distribution of offset in the frame due to dark current. In the offset accumulating period, similarly to the conversion period, the bias Vs is applied to the radiation detector 101. Thus, similarly to the first embodiment, the imaging controller 108 exercises control so that the reading circuit 103, the driving circuit 102, the A/D converter 106, and the signal transmitter 109 are switched from the normal operation status to an operation status with less power consumption.

Third Embodiment

Next, a third embodiment of the present invention will be described with reference to FIGS. 9 and 10. Components corresponding to those described above are designated by the same numerals, and description thereof will be omitted.

Figure 9:
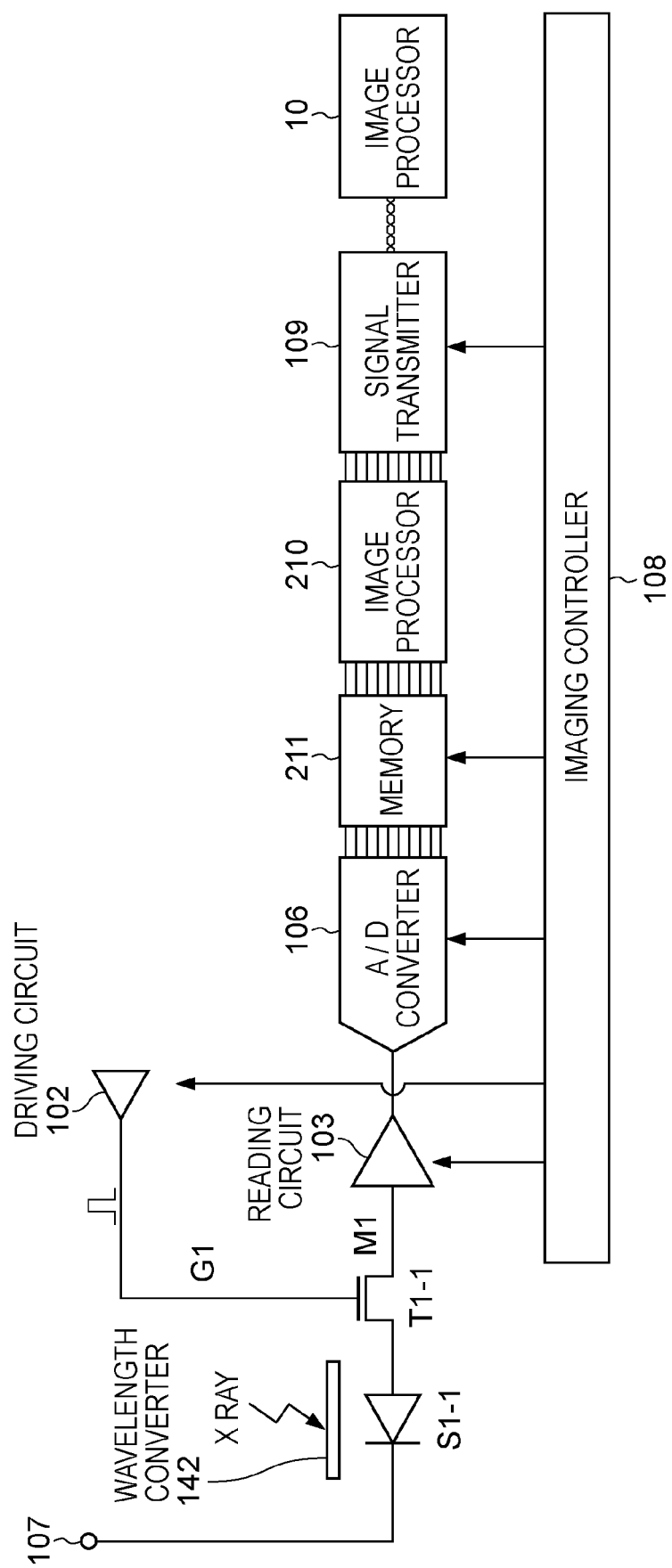
FIG. 9 is a schematic circuit diagram of one pixel in a radiation imaging apparatus according to a third embodiment of the present invention.
Figure 10:
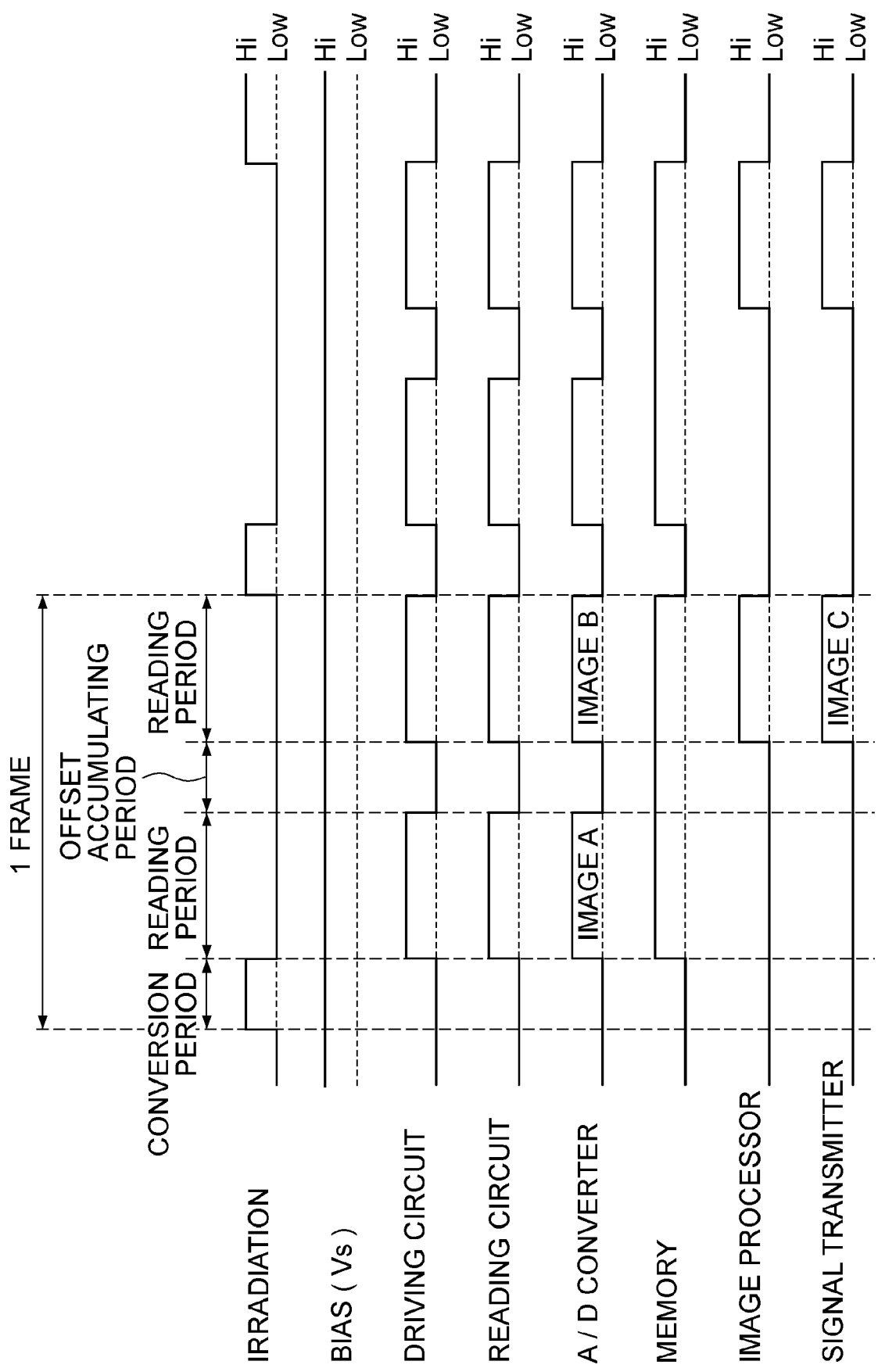
FIG. 10 is a timing chart schematically showing an operation of one pixel in the radiation imaging apparatus according to the third embodiment.

FIG. 9 is a schematic circuit diagram of one pixel in the radiation imaging apparatus according to this embodiment. FIG. 10 is a timing chart schematically showing an operation of one pixel in the radiation imaging apparatus according to this embodiment.

This embodiment differs from the first embodiment in that a memory 211 and an image processor 210 are provided between the A/D converter 106 and the signal transmitter 109 in the radiation imaging apparatus. An image A composed of radiation image signals acquired with irradiation is temporarily stored in the memory 211. Then, an image B composed of offset image signals obtained without irradiation is read, and the image processor 210 executes offset correction by subtracting the image B from the image A. Then, an image C obtained through the correction is transmitted by the signal transmitter 109 to the external image processor 10. Through the processing described above, the amount of signals transmitted from the signal transmitter 109 is reduced, so that power consumption and heat generation by the signal transmitter 109 is reduced accordingly.

Fourth Embodiment

Next, a fourth embodiment of the present invention will be described with reference to FIGS. 11 and 12. Components corresponding to those described above are designated by the same numerals, and description thereof will be omitted.

Figure 11:
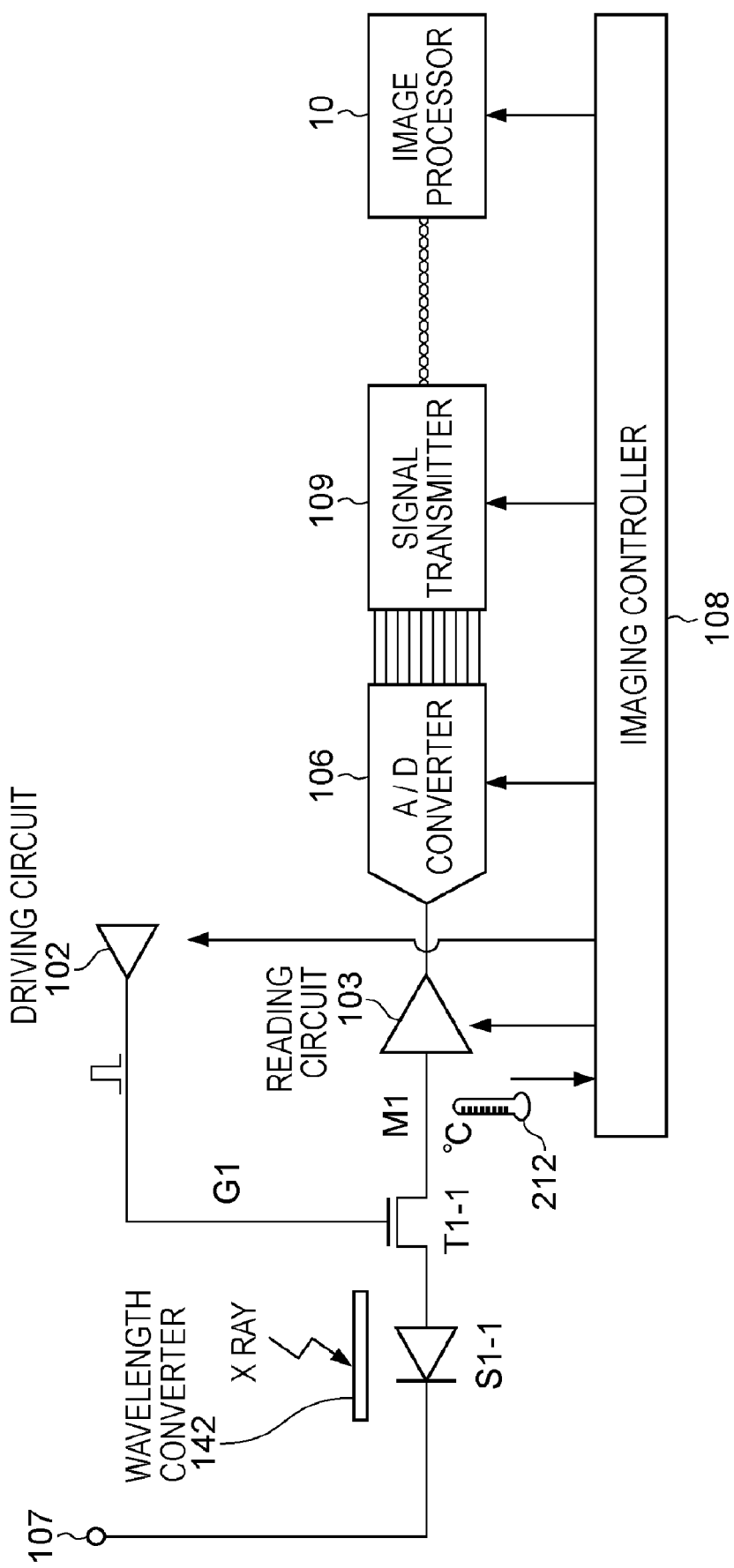
FIG. 11 is a schematic circuit diagram of one pixel in a radiation imaging apparatus according to a fourth embodiment of the present invention.

FIG. 11 is a schematic circuit diagram of one pixel in the radiation imaging apparatus according to this embodiment. FIG. 12 is a timing chart schematically showing an operation of one pixel in the radiation imaging apparatus according to this embodiment.

In this embodiment, compared with the first embodiment, a temperature sensor 212 is additionally provided in the radiation imaging apparatus. The imaging controller 108 receives signals representing results of detection from the temperature sensor 212, and controls the driving circuit 102, the reading circuit 103, the A/D converter 106, and the signal transmitter 109 on the basis of the signals. The temperature sensor 212 includes a temperature detector implemented by a thermocouple or the like, an amplifier, and a comparator. The temperature sensor 212 outputs a Hi level signal when the temperature exceeds a predetermined threshold.

Figure 12:
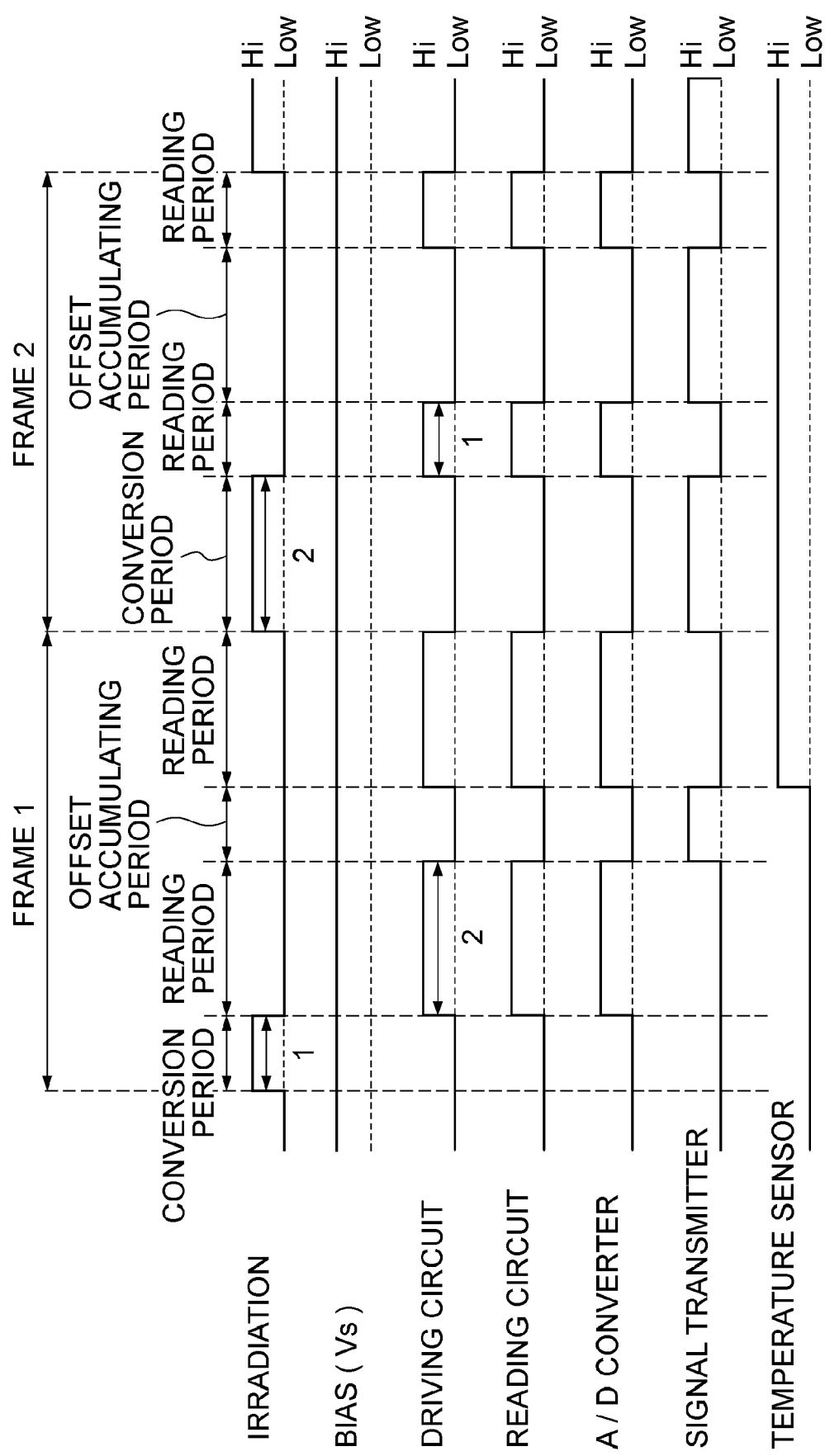
FIG. 12 is a timing chart schematically showing an operation of one pixel in the radiation imaging apparatus according to the fourth embodiment.

Referring to FIG. 12, in the middle of Frame 1, the signal output from the temperature sensor 212 is switched from Low to Hi, which indicates that the temperature has exceeded the threshold. Thus, from the next Frame 2, the driving pattern is changed. In Frame 1, the duty ratio of the conversion period (irradiation period) and the reading period is 1:2. On the other hand, the duty ratio is switched to 2:1 in Frame 2. As the conversion period (irradiation period) becomes longer, the operation periods of the driving circuit 102, the reading circuit 103, the A/D converter 106, and the signal transmitter 109 can be reduced as described in the context of the first embodiment. This serves to reduce power consumption of the radiation imaging apparatus as a whole, and therefore to reduce heat generation of the radiation imaging apparatus as a whole. However, since the reading period becomes shorter, the bandwidth of the reading circuit 103 has to be increased. This could increase noise components in images. According to this embodiment, the temperature is monitored and the conversion period (irradiation period) and the reading period on the basis of the temperature so that artifacts attributable to the temperature distribution of the radiation detector 101 can be suppressed. Although the period of one frame (frame rate) does not change by the switching of operation period in this embodiment, the reading period can be maintained by reducing the frame rate so that image quality can be maintained.

Fifth Embodiment

Next, a fifth embodiment of the present invention will be described with reference to FIGS. 13 and 14. Components corresponding to those described above are designated by the same numerals, and description thereof will be omitted.

Figure 13:
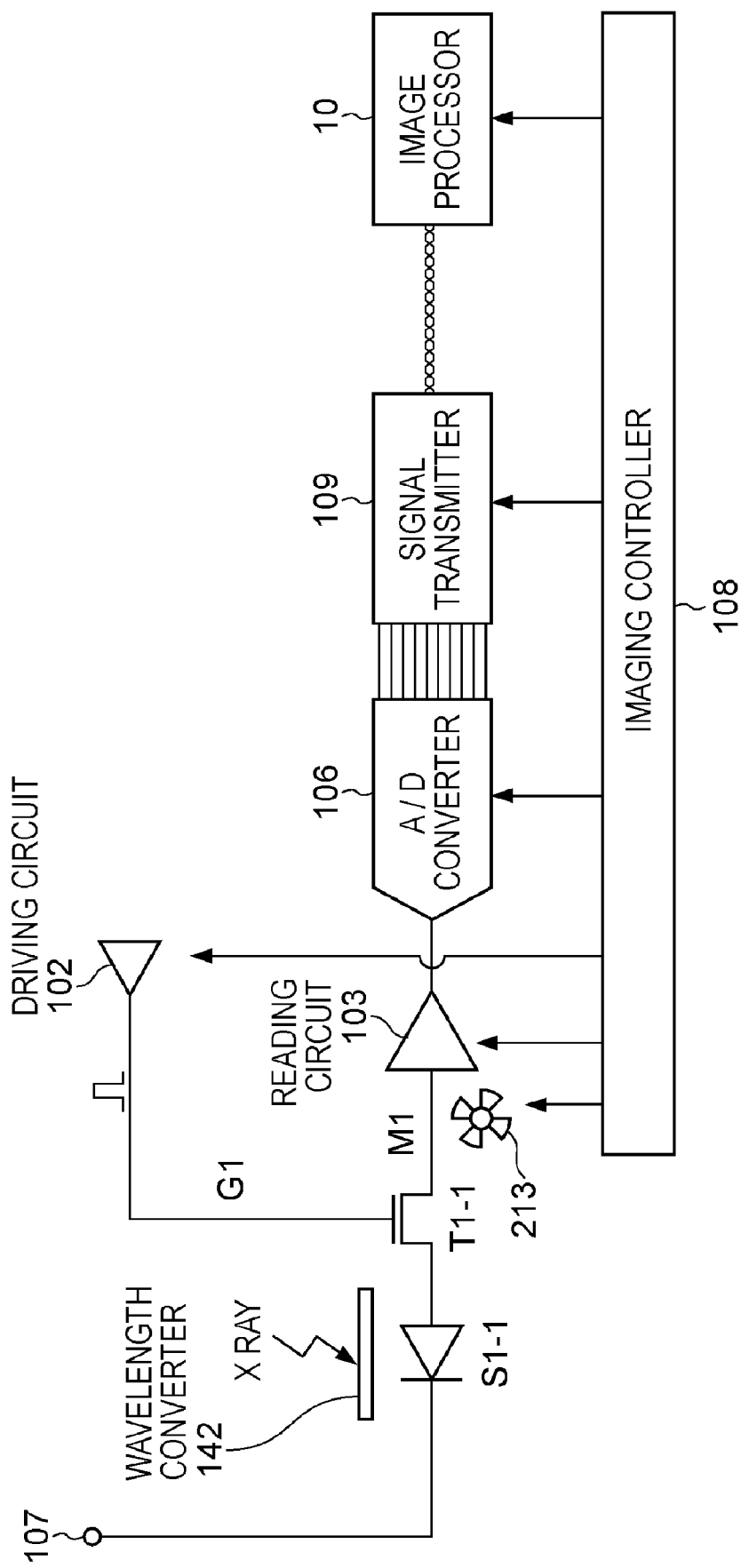
FIG. 13 is a schematic circuit diagram of one pixel in a radiation imaging apparatus according to a fifth embodiment of the present invention.
Figure 14:
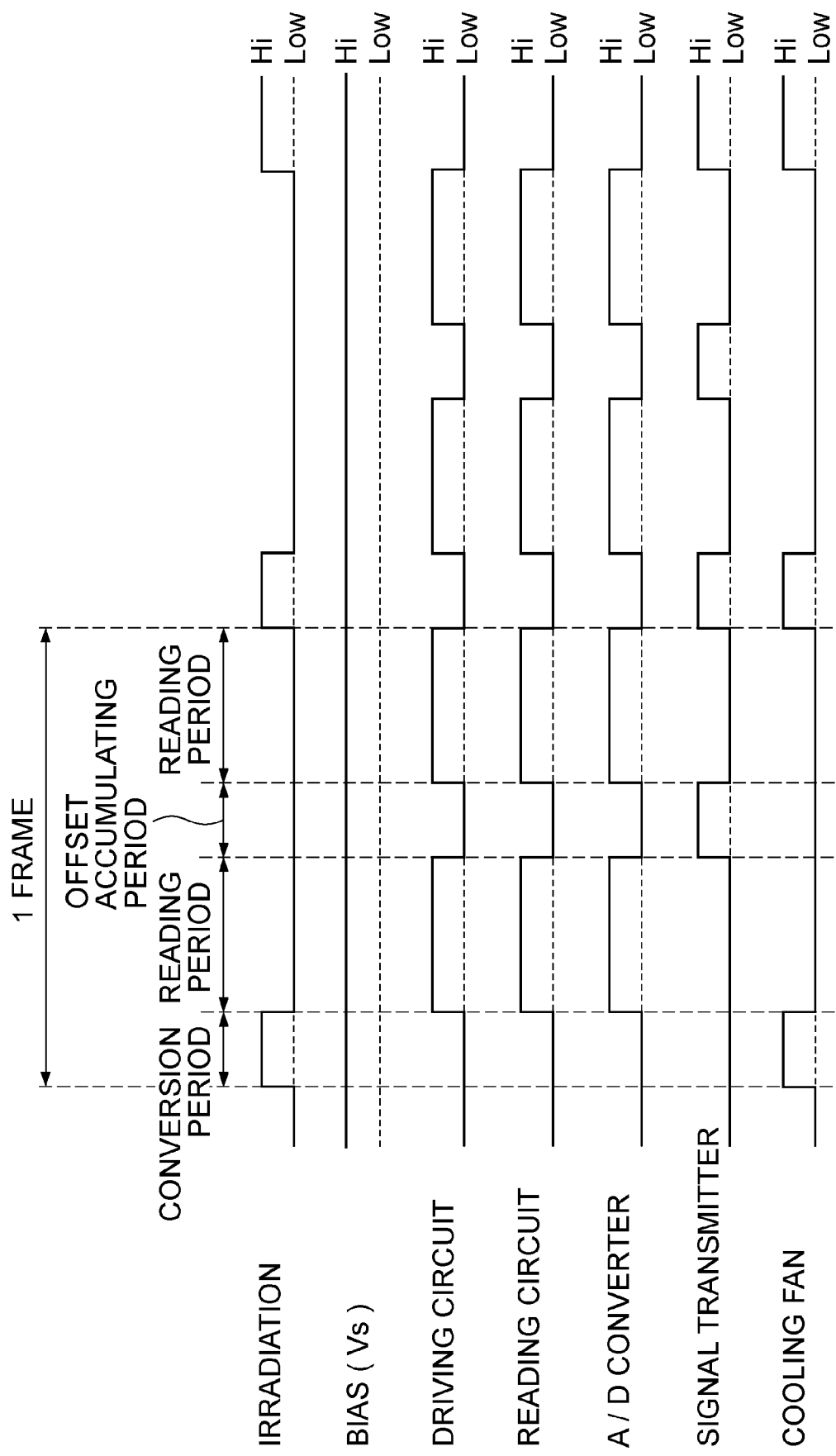
FIG. 14 is a timing chart schematically showing an operation of one pixel in the radiation imaging apparatus according to the fifth embodiment.

FIG. 13 is a schematic circuit diagram of one pixel in the radiation imaging apparatus according to this embodiment. FIG. 14 is a timing chart schematically showing an operation of one pixel according to this embodiment.

This embodiment differs from the first embodiment in that a cooling fan 213 constituting a cooling unit is additionally provided in the radiation imaging apparatus. The imaging controller 108 controls the operation of the cooling fan 213 for ventilation in the radiation imaging apparatus, thereby suppressing heat generation.

If the cooling fan 213 is driven in the reading period of a frame, noise could be generated. Thus, the cooling fan 213 is not driven in the reading period, and is driven in the conversion period (irradiation period). This serves for cooling in the radiation imaging apparatus, thereby suppressing temperature rise in the reading circuit 103 or the like. Although the cooling fan 213 is used in this embodiment, without limitation, for example, an electronic cooling element, such as a Peltier element, may be used.

Furthermore, the present invention can be embodiment in the form of, for example, execution of a program by a computer. Furthermore, media for supplying the program to the computer, such as a computer-readable recording medium, such as a CD-ROM having the program recorded thereon, or transmission of the program via a transmission medium such as the Internet, constitutes an embodiment of the present invention. Furthermore, the program itself constitutes an embodiment of the present invention. The program, recording medium, the transmission medium, and program product fall within the scope of the present invention.

The present invention relates to radiation imaging apparatuses and method, particularly, for example, to radiation imaging systems used for diagnosis in hospitals or radiation imaging apparatuses used for industrial non-destructive testing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-175568 filed Jun. 26, 2006 and No. 2007-125240 filed May 10, 2007, which are hereby incorporated by reference herein in their entirety.

What is claimed is:

1. A radiation imaging apparatus capable of taking a moving picture by acquiring a plurality of radiation image signals on the basis of a plurality of times of irradiation with radiation pulses, the radiation imaging apparatus comprising:
   a radiation detector having a two-dimensional array of pixels for detecting electric signals based on incident radiation rays;
   a reading circuit configured to read image signals based on the electric signals;
   an analog-to-digital convener configured to convert the electric signals read by the reading circuit into digital signals; and
   a controller configured to switch an operation status of the analog-to-digital convener in a period between a start of an n-th time of irradiation with radiation pulse and a start of an (n+1)-th time of irradiation with radiation pulse, where n is a natural number,
   wherein the period includes at least a first period which includes an irradiation period in which the radiation detector is irradiated with the n-th time radiation pulse and a second period in which the reading circuit reads the image signals, and
   wherein the controller controls the analog-to-digital converter during the period so that power consumption of the analog-to-digital converter in the first period is smaller than power consumption of the analog-to-digital converter in the second period.

2. The radiation imaging apparatus according to claim 1, wherein the controller is configured to switch during the period at least one of a status as to whether the analog-to-digital convener is activated or deactivated, a power supply voltage of an operation power supply for the analog-to-digital converter, a driving frequency of the analog-to-digital converter, and a status as to whether an output terminal of the analog-to-digital convener is open.

3. The radiation imaging apparatus according to claim 1, wherein the controller switches an operation status of the reading circuit during the period so that power consumption of the reading circuit in the first period is smaller than power consumption of the reading circuit in the second period.

4. The radiation imaging apparatus according to claim 3, wherein the reading circuit includes at least one amplifier, and, during the period, the controller is configured to switch an amount of current output from a current source for the at least one amplifier or a power supply voltage of an operation power supply applied to the at least one amplifier.

5. The radiation imaging apparatus according to claim 4, wherein the controller exercises control so that the amount of current output from the current source in the first period is less than the amount of current output from the current source in the second period.

6. The radiation imaging apparatus according to claim 4, wherein the controller exercises control so that the power supply voltage of the operation power supply in the first period is smaller than the power supply voltage of the operation power supply in the second period.

7. The radiation imaging apparatus according to claim 1, wherein the period further includes a third period in which offset signals are detected without the radiation detector being irradiated with radiation rays and a fourth period in which the reading circuit reads the offset signals, and
   wherein the controller controls the analog-to-digital converter during the period so that power consumption of the analog-to-digital converter in the third period is smaller than power consumption of the analog-to-digital converter in the second or fourth period.

8. The radiation imaging apparatus according to claim 3, wherein the period further includes a third period in which offset signals are detected without the radiation detector being irradiated with radiation rays and a fourth period in which the reading circuit reads the offset signals, and
   wherein the controller controls the reading circuit during the period so that power consumption of the reading circuit in the third period is smaller than power consumption of the reading circuit in the second or fourth period.

9. A radiation imaging system comprising:
   the radiation imaging apparatus according to claim 1; and
   a radiation source configured to irradiate the radiation imaging apparatus with the radiation rays.

10. A radiation imaging apparatus capable of taking a moving picture by acquiring a plurality of radiation image signals on the basis of a plurality of times of irradiation with radiation pulses, the radiation imaging apparatus comprising:
    a radiation detector having a two-dimensional array of pixels for detecting electric signals based on incident radiation rays;
    a reading circuit configured to read image signals based on the electric signals; and
    a controller configured to switch an operation status of the reading circuit in a period between a start of an n-th time of irradiation with radiation pulse and a start of an (n+1)-th time of irradiation wit radiation pulse, where n is a natural number,
    wherein the period includes at least a first period which includes an irradiation period in which the radiation detector is irradiated with the n-th time radiation pulse and a second period in which the reading circuit reads the image signals, and
    wherein the controller controls the reading circuit during the period so that power consumption of the reading circuit in the first period is smaller than power consumption of the reading circuit in the second period.

11. The radiation imaging apparatus according to claim 10, wherein the reading circuit includes at least one amplifier, and, during the period, the controller is configured to switch an amount of current output from a current source for the at least one amplifier or a power supply voltage of an operation power supply applied to the at least one amplifier.

12. The radiation imaging apparatus according to claim 11, wherein the amount of current output from the current source in the first period is less than the amount of current output from the current source in the second period or the power supply voltage of the operation power supply in the first period is smaller than the power supply voltage of the operation power supply in the second period.

13. The radiation imaging apparatus according to claim 10, wherein the period further includes a third period in which offset signals are detected without the radiation detector being irradiated with radiation rays and a fourth period in which the reading circuit reads the offset signals, and
    wherein the controller controls the reading circuit during the period so that power consumption of the reading circuit in the third period is smaller than power consumption of the reading circuit in the second or fourth period.

14. A radiation imaging system comprising:
    the radiation imaging apparatus according to claim 10; and
    a radiation source configured to irradiate the radiation imaging apparatus with the radiation rays.

* * * * *